Dec. 28, 1948.　　　R. A. NORBOM　　　2,457,710
FLUID METER CONSTRUCTION
Filed May 10, 1946

Inventor
Ragnar A. Norbom

Lee B. Kenon.
Attorney

Patented Dec. 28, 1948

2,457,710

UNITED STATES PATENT OFFICE 2,457,710

FLUID METER CONSTRUCTION

Ragnar A. Norbom, New York, N. Y., assignor to National Fitch Corporation, a corporation of Delaware Application May 10, 1946, Serial No. 668,814

1 Claim. (Cl. 73—242)

This invention relates to fluid meters and more particularly to an improved fluid meter construction for measuring the flow of milk or the like.

It is an object of this invention to provide an improved liquid flow meter for measuring milk or the like as it is loaded into tanks.

It is another object of this invention to provide a liquid flow meter which may be readily cleaned and/or sterilized.

It is another object of this invention to provide a liquid flow meter which is accurate in measuring fluids such as milk.

It is another object of this invention to provide a liquid flow meter operable without the liquid being under pressure.

It is still another object of this invention to provide a liquid flow meter in which the liquids being measured need not be exposed to the atmosphere.

It is a further object of this invention to provide a liquid flow meter of few parts which may be easily disassembled for inspection and washing.

It is a still further object of this invention to provide a liquid flow meter which may be economically constructed and which has a long life.

Other objects and advantages of this invention will be readily apparent from the following description of the preferred embodiment illustrated in the accompanying drawings in which.

Figure 1:
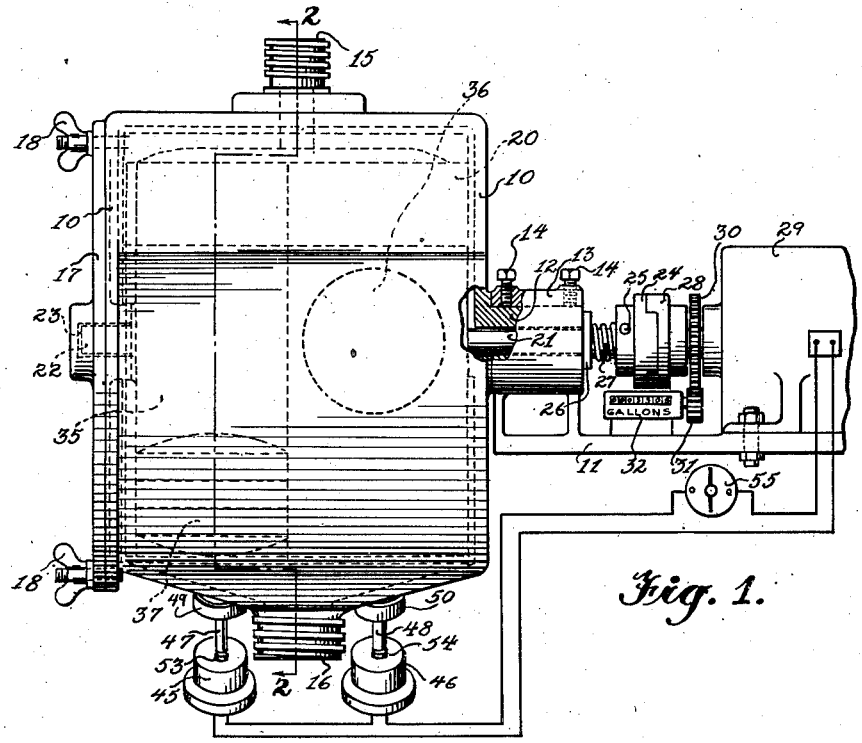
Figure 1 is an elevation view, partly cut away, of a fluid meter constructed in accordance with this invention.

Referring to Figure 1, the casing of the fluid meter is indicated by the numeral 10. The casing 10 is supported from the base 11 by means of an integral boss 12 removably secured in the collar 13 by set screws 14. An inlet opening 15 is provided at the top of the casing 10 and an outlet or discharge connection 16 is provided at the bottom of the casing. The inlet and outlet may be provided with quick pitch threads to facilitate the application and removal of inlet and outlet pipe or hose connectors. The open face of the casing 10 opposite the supporting boss 12 is closed by a removable plate 17 secured to the casing by wing nuts 18 or the like.

Within the casing 10 is a rotor 20 supported by a drive shaft 21 extending through the boss 12 and by a stub shaft 22 projecting into a bearing 23 in the cover plate 17. The drive shaft 21 is provided with a coupling member 24 secured thereon by a pin or set screw 25, and a sealing washer 26 may be urged against the outer end of the boss 12 by a compression spring 27 between the washer 26 and the coupling member 24. The rotor drive connection is completed by another coupling member 28 engaging member 24 and secured to the shaft of an electric motor 29 (shown in part), the motor being supported by the base 11. A gear 30 is provided on the shaft of motor 29 to engage a pinion 31 of a counter mechanism 32. The mechanism 32 may be calibrated in units of volume, such as gallons, and may be supported by the base 11. The coupling members 24 and 28 provide a flexible drive making it unnecessary to support the rotor drive shaft 21 in exact alinement with the driving shaft of motor 29.

Figure 2:
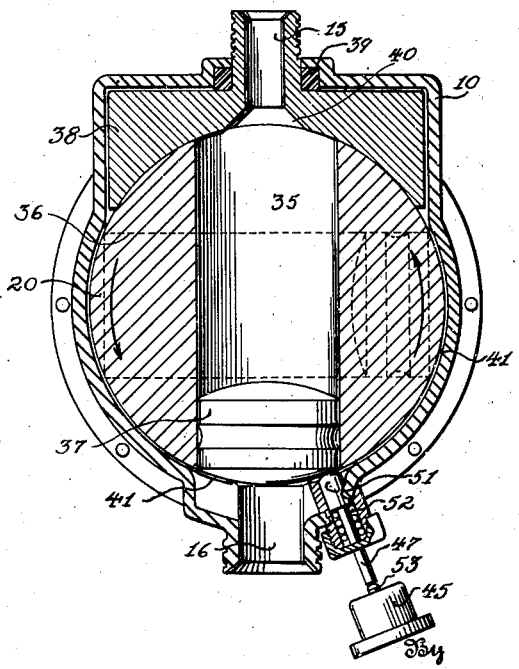
Figure 2 is a vertical sectional view taken on line 2—2 of Figure 1.

The rotor member 20 is provided with one or more bores or diametrical cylinders, two cylinders 35 and 36 being illustrated in the preferred construction shown. The cylinders 35 and 36 have their axes at an angle of 90° to one another and are spaced on the axis of the rotor 20 so that the cylinders do not intersect each other. The cylinders 35 and 36 extend completely through the rotor 20 from one side to the other as shown in Figure 2. Each cylinder is provided with a free piston 37 arranged to slide back and forth freely within the cylinder. The rotor 20 is provided with a cylindrical ground outer surface for engagement with a ground surface sealing member 38 arranged in the upper portion of the casing 10. The inlet connection 15 may be integral with the sealing member 38, as shown in Figure 2, and suitable resilient packing gasket 39, of rubber or the like, is provided between the connection 15, the member 38 and the top of the casing 10. The inlet connection passage may be flared at 40 to facilitate the inflow of fluids to the cylinders 35 and 36 of the rotor 20. Bearing ribs 41 may be provided on the inner surface of the casing 10 to slightly space the rotor 20 therefrom.

Switch members 45 and 46 are provided adjacent the under side of the casing 10 for actuation by push rods 47 and 48 extending into the casing 10 through packed openings 49 and 50. The rods 47 and 48 may be provided with enlarged and rounded head 51 within the casing urged inward by the coil spring 52. The push rods 47 and 48 engage switch actuators 53 and 54 of the switches 45 and 46, but are not secured thereto, in order that the casing 10 including the push rods 47 and 48, may be easily removed from the switches 45 and 46 for cleaning. The switches 45 and 46 are connected in series with a manual cut-off switch 55 and the power supply to motor 29, so that motor 29 will not operate when either of the switches 45 and 46 is open.

The mode of operation of the fluid meter described above will now be described. The inlet 15 being connected to a source of supply and outlet 16 being connected to a storage tank or the like, the switch 55 is closed after noting the reading of the counter 32 or after setting the counter 32 at zero. Fluid flows into the cylinder 35 of the rotor 20 until the free piston 37 is adjacent the outlet connection 16, as shown in Figure 2. When the piston 37 reaches the position illustrated, it engages the head 51 of push rod 47 which latter engages the actuator 53 to close the switch 45. Switch 46 being already closed, the motor circuit is completed causing motor 29 to operate. Operation of the motor 29 drives the rotor 20 through the coupling members 24 and 28 and the rotor drive shaft 21, thereby turning the rotor through a counter-clockwise angle of 90°. When the rotor 20 has turned 90°, the motor circuit is opened by switch 46, the push rod operator 48 of switch 46 being biased and moved to the upper position since it is not engaged by the free piston in cylinder 36. Fluid then flows into and fills the cylinder 36 and the piston in cylinder 36 moves to a position adjacent the outlet 16 in which it engages the push rod operator 48 of switch 46. The motor circuit is thus closed again causing motor 29 to rotate the rotor 20 through another 90° angle. When this rotation is completed, switch 45 is automatically opened and the motor stops while the fluid in cylinder 35 below the piston 37 flows downward through the outlet 16. At the same time, more fluid enters the cylinder 35 from inlet 15 filling the space above the piston 37 as the latter moves downward. When the piston 37 reaches a position adjacent the outlet 16, it again engages the head 51 of push rod 47 to close the switch 45 and start another 90° rotation of rotor 20. Both switches 45 and 46 remain closed while the rotor is driven through its 90° movement since the push rod heads 51 are engaged by the circumferential surface of the rotor 20 between the open ended cylinders 35 and 36. It will be apparent that the automatic switches 45 and 46 continue to cause successive 90° rotations of the rotor 20 as long as there is a continued supply of fluid entering through the inlet 15 effective to move the free pistons 37 to the lower position, shown in Figure 2, to cause repeat actuation of the driving motor 29. The counter 32 geared to the motor shaft through gears 30 and 31 may be calibrated in gallons or other suitable units for the liquid being metered and thus indicates the volume which flows through the meter.

When it is desired to clean and/or sterilize the fluid meter, the inlet and outlet connections are disconnected and the set screws 14 and 25 are loosened. The meter casing 10 may then be withdrawn from the supporting bushing 13 for disassembly. Removal of the closure plate 17 from the casing 10 permits the rotor 20 to be withdrawn from the casing, and the pistons 37 may then be removed from the cylinders 35 and 36. The sealing block 38 may next be easily removed from the casing 10, and the interior of the casing 10, the sealing block 38, the rotor 20, the pistons 37 and the interior of the closure plate 17 may be readily washed and sterilized. The meter is then reassembled in reverse order by insertion of the sealing block 38 in the casing 10, and insertion of the rotor 20 in the casing after the pistons have been placed in the respective cylinders 35 and 36. The closure plate 17 is secured to the casing 10 and the unit is remounted in its supporting collar 13 and the rotor shaft 21 is reconnected to the coupling member 24. The unit is thus again ready for use.

Although the fluid meter described and illustrated is provided with two cylinders 35 and 36, it will be readily apparent to those skilled in the art that the meter may have only one cylinder or may have more than two cylinders. If only one cylinder is provided, there need be only one control switch and the circuit will be closed to turn the rotor 180° on each actuation rather than 90°. Where more than two cylinders are used, it will be necessary to have a control switch for each cylinder and the amount of rotation of the rotor in degrees upon each actuation will be 180 divided by the number of cylinders provided. It will also be apparent that the meter construction described may be arranged for intermittent rotation of the metering rotor in either a clockwise or counter-clockwise direction.

It is to be understood that the fluid flow meter will operate to measure fluids entering the inlet 15 under pressure the same as it does for fluids entering the inlet by gravity. The fluids measured need not be exposed to the atmosphere and this feature is of importance in metering fluids such as milk. The ease with which the meter construction may be disassembled for cleaning and/or sterilizing is likewise important where it is used in measuring milk and similar liquids. The construction described has been found particularly useful for measuring the quantity of milk supplied by dairy farmers to the milk collection trucks sent out by central dairies to collect milk from a number of farms. The scope of this invention is not limited to the exemplary structures illustrated and specifically described, but is intended to be limited only by the scope of the following claim.

I claim:

In a milk flow meter construction, the combination comprising a casing having an inlet connection on its upper side and an outlet connection on its lower side, an integral boss projecting laterally from said casing for supporting said casing, a rotor supported for rotation within said casing on a shaft extending through said boss, said rotor having two cylinders extending therethrough, one cylinder being axially displaced along the rotor axis and at right angles to the other cylinder, a free piston for each of said cylinders and slidable therein, a pair of push rods mounted on said casing adjacent said outlet connection and engageable by said pistons when the piston is at the lower end of its cylinder adjacent said outlet connection, a pair of circuit closers connected in series and engaged by said rods, and a motor-driven means controlled by said circuit closers and connected to said rotor shaft for rotating said rotor 90° each time one of said pistons engages one of said push rods.

RAGNAR A. NORBOM.

REFERENCES CITED

The following references are of record in the file of this patent:

UNITED STATES PATENTS

| Number | Name | Date |
| --- | --- | --- |
| 108,804 | Massey | Nov. 1, 1870 |
| 540,257 | Jones | June 4, 1895 |
| 1,601,565 | Dudler | Sept. 28, 1926 |
| 1,872,103 | Bergmann | Aug. 16, 1932 |
| 2,192,602 | Meshberg | Mar. 5, 1940 |